United States Patent Office

Re. 25,824
Reissued July 27, 1965

25,824

PHOTOGRAPHIC SILVER HALIDE EMULSIONS SENSITIZED WITH CYANINE DYES CONTAINING THE BENZISOXAZOLE NUCLEUS

Emil B. Rauch, Port Dickinson, N.Y., assignor to General Aniline & Film Corporation, New York, N.Y., a corporation of Delaware No Drawing. Original No. 3,071,467, dated Jan. 1, 1963, Ser. No. 96,347, Mar. 17, 1961. Application for reissue Dec. 18, 1964, Ser. No. 432,916
7 Claims. (Cl. 96—106)

Matter enclosed in heavy brackets [ ] appears in the original patent but forms no part of this reissue specification; matter printed in italics indicates the additions made by reissue.

This invention relates to new cyanine dyes derived from benzisoxazole, to photographic silver halide emulsions sensitized with said dyes and to methods for making the dyes.

It is known to extend the spectral sensitivity of photographic silver halide emulsions by means of dyes known as cyanines. Among the dyes which have been investigated and found useful for this purpose are those containing a benzoxazole nucleus. There is not, however, any information or data on sensitizing dyes embodying a benzisoxazole nucleus. In fact, as far as I have been able to ascertain, the prior art is completely silent on the aforesaid entities.

I have discovered that particularly efficacious sensitizing dyes can indeed be produced by the utilization of a benzisoxazole ring for at least one of the heterocyclic nuclei connected to the polymethine conjugated chain of the sensitizing dye structure. In addition to extending the spectral sensitivity of silver halide emulsions, the dyes containing a benzisoxazole ring as described herein are very tenaciously held or adsorbed by the silver halide grain surface. This condition is essential since, otherwise, the dye, if not strongly absorbed will be displaced by the various adjuncts incorporated in the silver halide emulsion, such as color formers, sensitizers, stabilizers and the like.

It is, therefore, a primary object of this invention to provide sensitizing dyes of the cyanine type derived from a benzisoxazole nucleus, photographic silver halide emulsions sensitized with these dyes and to a method for preparing them.

Other objects and purposes will become apparent as the description proceeds.

The new dyes of the cyanine series containing at least one benzisoxazole nucleus can be represented by the following general formulae:

(I)

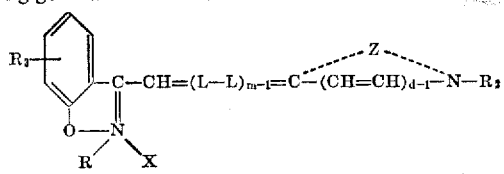

(II)

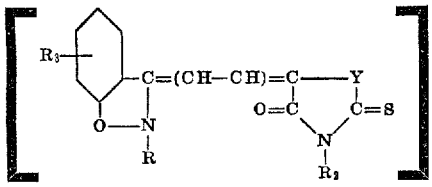

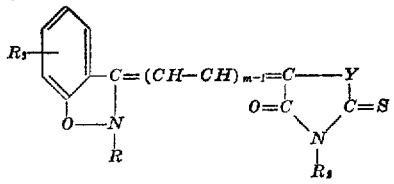

wherein R, $R_1$ and $R_2$ represent a lower alkyl group, e.g., methyl, ethyl, carboxymethyl, carboxyethyl, propyl, butyl, β-sulfoethyl, 3-sulfopropyl, 4-sulfobutyl, etc.; $R_3$ represents *hydrogen or* an organic grouping selected from the class consisting of lower alkyl, chlorine, lower alkoxyl, nitro, hydroxy, amino, etc.; m is an integer of from 2 to 3, d is an integer of from 1 to 2, X is an anion, e.g., halide such as chloride, bromide or iodide, perchlorate, p-toluenesulfonate, ethylthiosulfate, etc.; L represents a methine group of the formula $\equiv C—R_4$ wherein $R_4$ represents hydrogen or a lower alkyl group as above for R, $R_1$ and $R_2$; Y is selected from the class consisting of O, S and $NR_5$ wherein $R_5$ represents a lower alkyl group as above for R, $R_1$ and $R_2$, and Z represents the non-metallic atoms necessary to complete a heterocyclic ring system of the type commonly encountered in cyanine dyes such as a thiazole ring, a thiadiazole ring, a benzothiazole ring, a benzoselenazole ring, a benzoxazole ring, an indolenine ring, a quinoline ring, a pyridine ring, a benzimidazole ring, a benzisoxazole ring, etc.

The carbocyanine dyes represented by Formula I, i.e., when m=2, can advantageously be prepared by condensing a benzisoxazole quaternary salt as represented by the following formula:

(III)

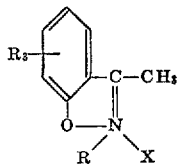

wherein R, $R_3$ and X each have the values given above, together with a cyclammonium quaternary salt of the following general formula:

(IV)

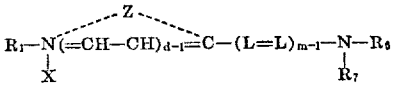

wherein $R_1$, X, d, L, and Z have the values as set forth above, $R_6$ represents an acyl group (e.g., acetyl, propionyl, benzoyl, etc.) and $R_7$ represents an aromatic group (such as phenyl, toluyl, naphthyl, etc.) and d is equal to 2. The dye reactions are advantageously carried out in the presence of a basic condensing agent, that is, an acid binding agent, such as a tertiary organic amine, i.e., trialkylamines as represented by triethyl amine and the like. In some instances, it may be desirable to carry out the dye condensations in the presence of lower molecular weight aliphatic alcohols, such as ethyl N-propyl, etc. The application of heat, particularly under reflex conditions, accelerates the dye reactions. Examples of cyclammonium quaternary salts of Formula IV for producing carbocyanines as represented by Formula I are the cyclammonium quaternary salts containing in the α- or γ-position thereof a β-arylacylaminovinyl (e.g., β-acetanilidovinyl) group or a β-alkylmercapto or β-arylmercaptovinyl group (e.g., β-methylmercapto vinyl) and the like.

For producing dicarbocyanine dyes of the type represented by Formula I wherein m equals 3, cyclammonium quaternary salts of the type represented by Formula IV are selected in which d=3. Examples of these quaternary salts are the 4-arylamino-1,3-butadienyl cyclammonium quaternary salts having in the reactive 2 or 4 position such group as 2(4-anilino-1,3-butadienyl), (4-p-chloroanilino-1,3-butadienyl), 2(4-acetanilido-1,3-butadienyl), 2-(4-naphthylamino-1,3-butadienyl) etc. The dye condensations for preparing dicarbocyanines are carried out under basic conditions in the manner described for the preparation of carbocyanine dyes.

The merocyanine dyes of the type represented by Formula II can be produced by condensing a cyclammonium quaternary salt of the type represented by Formula IV wherein Z represents the non-metallic atoms necessary to complete a nucleus of the benzisoxazole series, L equals hydrogen and $R_1$, $R_6$, $R_7$, m and X and D have the values previously designated. If it is desired to produce a mero-carbocyanine dye of the type depicted by Formula II, then the cyclammonium quaternary salt IV is of the vinyl type, that is, wherein m=2. On the other hand, if it is desired to produce a mero-dicarbocyanine dye the cyclammonium quaternary salt of Formula IV is selected in which m is equal to 3, the so-called 1,3-butadienyl types previously alluded to. The condensations for producing the mero-dicarbocyanine dyes of Formula II are advantageously effected in the presence of an acid binding agent of the type mentioned above such as trialkylamines (e.g., triethylamine, etc.) and an inert diluent such as 1,4-dioxane, acetic anhydride, a lower molecular weight alcohol such as propyl alcohol, ethyl alcohol or the like.

Typical cyclic keto methylene ring systems which can be utilized in preparing the merocyanines of Formula II include a rhodanine nucleus, a 2-thio-2,4-oxazolidinedione nucleus, a pyrazolone nucleus, a 2-thiohydantoin nucleus, etc.

To prepare benzisoxazole symmetrical carbocyanine dyes of Formula I, the quaternary salt of Formula IV is reacted with an orthoester such as $R_8C—(OEt)_3$ wherein $R_8$ can be hydrogen or alkyl in a basic solvent medium such as pyridine or acetic anhydride or a mixture of both of these. By substituting 1,1,3-trimethoxypropane for the ortho ester, the corresponding symmetrical dicarbocyanine structure is formed.

The following examples will serve to illustrate more fully the manner whereby I practice my invention.

EXAMPLE 1

3-ethyl-5-[2-(2-ethyl-3-benzisoxazolinylidene) ethylidene]-rhodanine

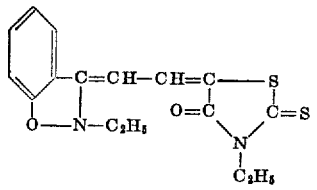

1.2 g. of 2-ethyl-3-β-anilinovinylbenzisoxazolium iodide and 0.5 g. of 3-ethylrhodanine were combined with a mixture of 8 ml. of pyridine and 0.6 ml. of acetic anhydride and 0.75 ml. of triethylamine. Dye formation started immediately and was completed by heating the reaction mixture for 5 minutes on the steambath. Upon cooling the dye crystallized out. After the mixture was centrifuged, the supernatant liquid was decanted and the dye boiled out twice with i-propanol. The yield was 0.64 g. The absorption maximum in methanol is 493 mμ. The dye sensitized a gelatino silver bromide emulsion with a maximum at 550 mμ. M.P.: 235 (from i-propanol).

EXAMPLE 2

3-carboxymethyl-5-[2-(2-ethyl-3-benzisoxazolinylidene) ethylidene]-rhodanine

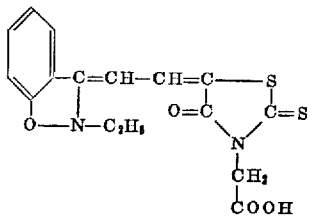

1.2 g. of 2-β-anilinovinyl-2-ethylbenzisoxazolium iodide and 0.6 g. of 3-carboxymethylrhodanine were combined with a mixture of 5.0 ml. of methanol and 0.6 ml. of acetic anhydride. 0.75 ml. of triethylamine was then added.

After standing for 3 hours at room temperature, the dye was isolated and boiled out with 90% pyridine. The yield of purified dye was 0.4 g. Its absorption in methanol was 489 mμ. The dye sensitized a gelatino silver bromide emulsion with a maximum at 552 mμ. M.P.: 280–281° C. (from 80% pyridine).

EXAMPLE 3

3-ethyl-5-[2-(2-ethyl-3-benzisoxazolinylidene)-2-butenylidene]rhodanine

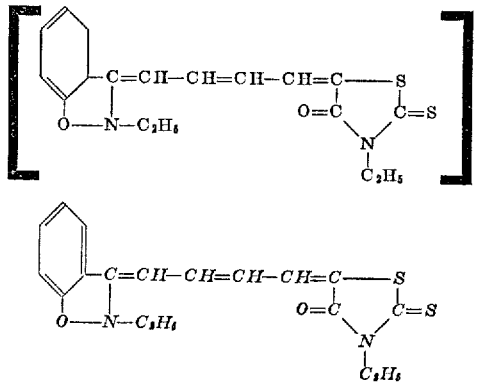

0.8 ml. of triethylamine was added to a mixture of 0.32 g. of 3-ethylrhodanine and 0.92 g. of 3-(4-acetanilido-1,3-butadienyl)-2-ethylbenzisoxazolium iodide contained in 5 ml. of pyridine. After 10 minutes at room temperature, the dye formation was completed by heating the reaction mixture on the steambath for 5 minutes. The dye was purified by two crystallization from i-propanol. The yield of purified dye was 0.37 g. Its absorption in methanol was 577 mμ. The dye sensitized a gelatino silver bromide emulsion with a maximum at 650 mμ. M.P.: 264–265° C. (from i-propanol).

EXAMPLE 4

Anhydro-2-ethyl-3′-(3-sulfopropyl)isoxathiacarbocyanine hydroxide

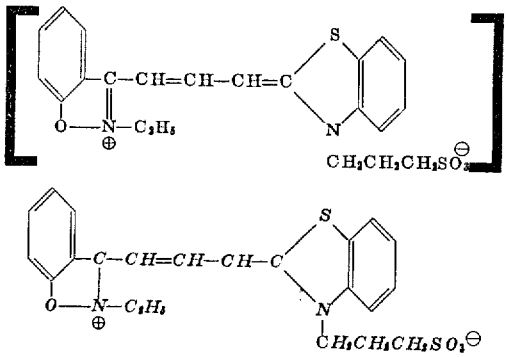

0.7 ml. of acetic anhydride and 0.7 ml. of triethylamine was added to a mixture of 1.2 g. of 2-ethyl-3-β-anilinovinylbenzisoxazolium iodide, 0.8 g. of anhydro 2-methyl-3-(3-sulfopropyl)benzothiazolium hydroxide in 6.0 ml. of pyridine. After 5 minutes at room temperature the dye condensation was brought to completion by heating the reaction mixture for 5 minutes on the steambath. The product crystallizes out upon chilling. 0.88 g. of dye was obtained after it was boiled out with i-propanol. It sensitized a gelatino silver bromide emulsion with a maximum at 550 mμ. M.P.: 311–313° C. (from i-propanol).

EXAMPLE 5

2,3′-diethyl-5′-methylisoxathiadiazolocarbocyanine iodide

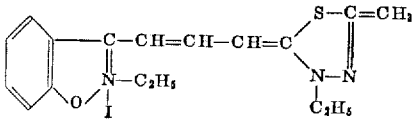

This dye was prepared using the procedure given in Example 4, but replacing anhydro-2-methyl-3-(3-sulfopropyl)benzothiazolium hydroxide of the example by an equivalent amount of 2,5-dimethylthiadiazolium iodide contained in 8 ml. of pyridine. The yield of dye was 1.2 g. Its absorption in methanol was 496 mμ. It sensitized a gelatino silver bromide emulsion with a maximum at 530 mμ. M.N.: 258–261° C. (from ethanol).

EXAMPLE 6

2-ethyl-5-diethylamino-3′-methylisoxathiadiazolocarbocyanine iodide

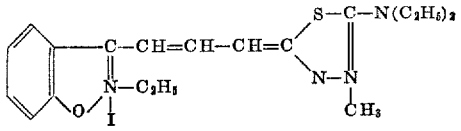

This dye was prepared using the procedure of Example 4 by replacing anhydro 2-methyl-3-(3-sulfopropyl)benzothiazolium hydroxide used in that example by an equivalent amount of 5-diethylamino-2,3-dimethylthiadiazolium iodide in 10 ml. of i-propanol. After the condensation was completed, ether was added to bring the dye out. The yield of product was 0.52 g. Its absorption in methanol is 504 mμ. It sensitized a gelatino silver bromide emulsion with a maximum at 530 mμ. M.P.: 215° C. (from i-propanol).

EXAMPLE 7

2-ethyl-3′,4′-dimethylisoxathiazolocarbocyanine iodide

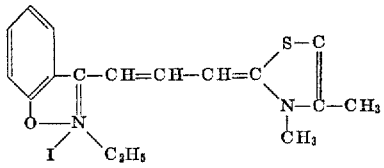

The dye was prepared in the same manner as the dye of Example 4 by replacing anhydro 2-methyl-3-(3-sulfopropyl)benzothiazolium hydroxide used in that example by 0.8 g. 2,3,4-trimethylthiazolium iodide in 8 ml. of pyridine. The yield of dye was 0.76 g. Its absorption in methanol is 507 mμ. The dye sensitized a gelatino silver bromide emulsion with a maximum at 545 mμ. M.P.: 255–256° C. (from methanol).

EXAMPLE 8

2,1′-diethylisoxa-4′-carbocyanine iodide

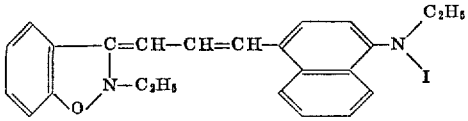

This dye was prepared in the same general manner as the dye of Example 4 using 0.6 g. of lepidine ethiodide and 0.8 g. 3-β-anilinovinyl-2-ethylbenzisoxazolium iodide in 15 ml. of i-propanol. The yield of dye was 0.64 g. Its maximum absorption in methanol is 594 mμ. It sensitizes a gelatino silver bromide emulsion with a maximum at 620 mμ. M.P.: 266–267° C. (from ethanol).

EXAMPLE 9

Anhydro-1′-ethyl-2-(3-sulfopropyl)isoxa-4′-carbocyanine hydroxide

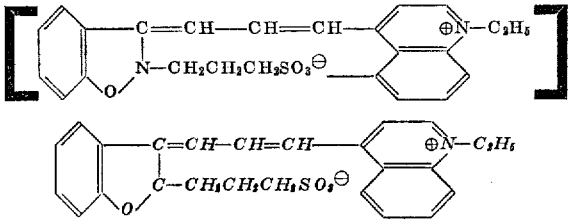

This dye was prepared by combining 0.72 g. of anhydro-3-β-anilinovinyl - 2 - (3-sulfopropyl)benzisoxazolium hydroxide and 0.6 g. of lepidine ethiodide in 5 ml. of dimethylformamide by the identical procedure as outlined in Example 4. The dye crystallized slowly and was isolated after the reaction mixture stood at room temperature overnight. The yield of product was 0.3 g. The absorption of the dye in methanol is 593 mμ. It sensitizes a gelatino silver bromide emulsion with a maximum at 670 mμ. M.P.: 312–313° C. (from methanol).

EXAMPLE 10

Anhydro-3′-benzyl-2-(3-sulfopropyl)isoxathiazolocarbocyanine hydroxide

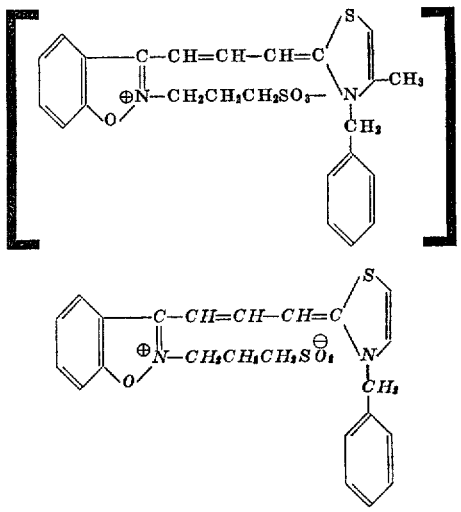

This dye was prepared in the same manner as the dye of Example 4 by condensing 0.7 g. of anhydro-3-β-anilinovinyl-2-(3-sulfopropyl)isoxazolium hydroxide and 0.55 g. of 3-benzyl-2,4-dimethylthiazolium iodide in 5 ml. of i-propanol. After the dye condensation was completed, ether was added to precipitate the dye. The yield of product amounted to 0.35 g. The absorption maximum in methanol is 515 mμ. It sensitizes a gelatino silver bromide emulsion with a maximum at 540 mμ. M.P.: 302–303° C. (from methanol).

EXAMPLE 11

2,2′-diethylisoxacarbocyanine iodide

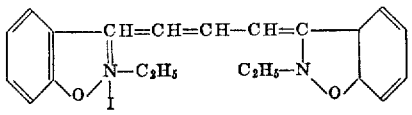

3 g. of 2-ethyl-3-methylbenzisoxazolium iodide, 4 g. of phenol and 3 ml. of triethylamine were heated to 80°. To this mixture was added 2.5 g. of triethyl orthoformate with stirring over a period of 15 minutes. The temperature was raised to 105° C. and held for 30 minutes. The reaction mixture was brought to room temperature and 60 ml. of ether was added. Stirring was continued for 30 minutes. The dye was separated by decantation and boiled out twice with i-propanol. The yield of product was 2.3 g. The absorption maximum of the dye in methanol is 483 mμ. It sensitized a gelatino silver bromide emulsion with a maximum at 510 mμ. M.P.: 261° C. (from ethanol).

EXAMPLE 12

2,2′-diethyl-9-methylisoxacarbocyanine iodide

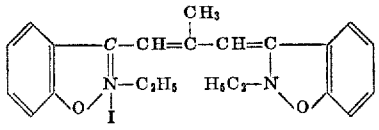

This dye was prepared using the same procedure as given in Example 11, but replacing triethyl orthoformate used in that example by 2.5 g. of triethyl orthoacetate. The yield of dye was 1.5 g. Its absorption maximum in methanol is 487 mμ. It sensitizes a gelatino silver bromide emulsion with a maximum at 514 mμ. M.P.: 269–270° C. (from ethanol).

EXAMPLE 13

2,2′-9-triethylisoxacarbocyanine iodide

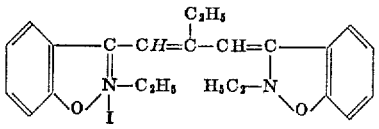

This dye was prepared in the same manner as the dye of Example 2 by replacing triethyl orthoformate used in that example by 2.7 g. of triethyl orthopropionate. The yield of dye amounted to 1.73 g. The absorption maximum of the dye in methanol is 484 mμ. It sensitizes a gelatino silver bromide emulsion with a maximum at 520 mμ. M.P.: 267–269° C. (from ethanol).

EXAMPLE 14

2,2′-diethylisoxadiacarbocyanine iodide

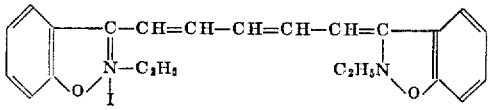

This dye was prepared by two different methods, introducing the methine chain either with methyltriethylmalondialdehyde diacetate or with 1,3,3-trimethoxypropene.

(a) 1.45 g. of 2-ethyl-3-methylbenzisoxazolium iodide and 1.0 g. of methyltriethylmalondialdehyde diacetate were refluxed in 10 ml. pyridine for 15 minutes. The dye was precipitated by the addition of ether and boiled out twice with i-propanol. Yield: 0.35 g. The dye, after crystallization from methanol, melts at 164–165° C. Its absorption in methanol is 578 mμ.

(b) 0.6 g. of 2-ethyl-3-methylbenzisoxazolium iodide, 0.5 g. of 1,3,3-trimethoxypropene, 4 ml. of i-propanol and 0.5 ml. of triethylanine were refluxed for 30 minutes. The addition of ether precipitated the dye. Yield: 0.30 g. M.P.: 163–165° C. Its absorption in methanol is 578 mμ. The dye sensitized a gelatino silver bromide emulsion with a maximum at 620 mμ.

EXAMPLE 15

2-ethyl-3′,4′-dimethylisoxathiazolodicarbocyanine iodide

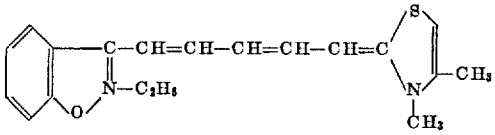

0.74 g. of 3-(4-acetanilido-1,3-butadienyl)-2-ethyl benzisoxazolium iodide, 0.45 g. of 2,3,4-trimethylthiazolium iodide, 5 ml. of i-propanol and 0.5 ml. of triethylanine were stirred at room temperature for ten minutes and then refluxed for five minutes on the steambath. After chilling 0.28 g. of the dye was filtered off. M.P.: 197–198° C. (from i-propanol). Absorption in methanol is 600 mμ. The dye sensitizes a gelatino silver bromide emulsion with a maximum at 640 mμ.

EXAMPLE 16

2,3′-diethyl-isoxathiazolinodicarbocyanine iodide

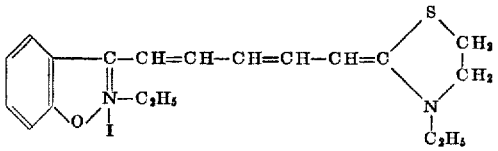

0.46 g. of 2-ethyl-3-(4-acetanilido 1,3-butadienyl)-benzisoxazolium iodide, 0.25 g. of 3-ethyl-2-methylthiazolium iodide, 5.0 ml. of i-propanol and 0.4 ml. of triethylanine were stirred at room temperature for ten minutes and then refluxed for five minutes on the steambath. The dye crystallized out after standing overnight. Yield 0.26 g; M.P.: 201–203° C. (from n-butane-ether). Its absorption in methanol is 545 mμ. It sensitizes a gelatino silver bromide emulsion with a maximum at 585 mμ.

EXAMPLE 17

2,2′-β-dicarboxyethylisoxadicarbocyanine iodide

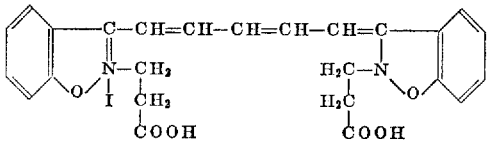

1.5 g. of 2-carboxyethyl-3-methylbenzisoxazolium iodide, 1.0 g. of 1,3,3-trimethoxypropene, 6.0 ml. of i-propanol and 0.5 ml. of triethylamine were refluxed for 30 minutes. The solution was chilled to precipitate the dye. It was boiled out twice with i-propanol. Yield: 0.45 g. M.P.: 181° C. (from methanol-water). Its absorption in methanol is 578 mμ. The dye sensitizes a gelatino silver bromide emulsion with a maximum at 615 mμ.

PREPARATION OF INTERMEDIATES

EXAMPLE 18

2-β-carboxyethyl-3-methylbenzisoxazolium iodide

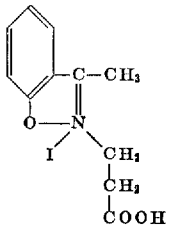

2.3 g. of 3-methylbenzisoxazole and 4.8 g. of β-iodopropionic acid were heated for 4 hours at 131°. A brown syrup was obtained which on trituration with ether solidified. Yield: 3.8 g. The crude material was dissolved in methanol in the cold, charcoaled, filtered and brought to crystallization by the addition of ether. M.P.: 174–176° C.

Calc.: N, 4.20; I, 38.09. Found: N, 4.54; I, 37.79.

2-methylbenzisoxazole, used in preparing the above and other quaternary salts for practicing the invention, was synthesized in accordance with the procedure disclosed in Ann. 449, 63 (1926).

EXAMPLE 19

2-ethyl-3-methylbenzisoxazolium iodide

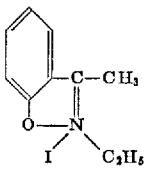

9.4 g. of 3-methylbenzisoxazole and 1.9 ml. of ethyliodide were placed in a bomb and maintained at 112° C. overnight. The supernatant was decanted and the solid triturated with a mixture of ether and acetone (2 to 1 by volume), filtered off and washed with a fresh quantity of ether. The yield of quaternary salt amounted to 19.2 g. M.P.: 157–158° C. (from methanol-ether).

Calc.: N, 4.84. Found: N, 4.89.

EXAMPLE 20

3-β-anilinovinyl-2-ethylbenzisoxazolium iodide

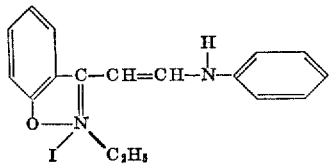

10.5 g. of 2-ethyl-3-methylbenzisoxazolium iodide and 7.5 g. of diphenylformamidine were heated for 10 minutes at 131° C. The brown syrup which formed, on treatment with a mixture of alcohol and ether (1:1 by volume) solidified. The yellowish product was filtered off and the solid washed thoroughly with ether. The yield was 8.2 g. M.P.: 215–217° C. (from methanol-water).

Calc.: N, 7.14. Found: N, 6.90.

EXAMPLE 21

Anhydro-3-β-anilinovinyl-2-(3-sulfopropyl)-benzisoxazolium hydroxide

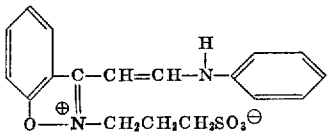

2.6 g. of 3-methylbenzisoxazole and 2.4 g. of propiosultone was placed in 5 ml. of anhydrous ether and the mixture heated in a bomb overnight at 112° C. The resulting semisolid cyclammonium salt was separated from the supernatant liquid. 4.0 g. of diphenylformamidine was mixed with the isolated salt and the mixture heated at 131° C. for 10 minutes. Trituration of the reaction mixture with ether yielded 6.5 g. of the anilinovinyl inner quaternary salt.

EXAMPLE 22

3-(4-acetanilido-1,3-butadienyl)-2-ethylbenzisoxazolium iodide

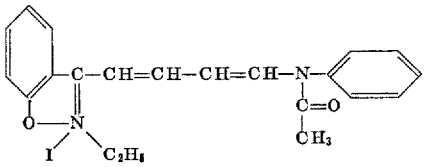

4 g. of 2-ethyl-3-methylbenzisoxazolium iodide, 4 g. of anilinoacroleinanil hydrochloride were refluxed in a mixture of 20 ml. acetic anhydride and 4 ml. acetic acid for 45 minutes. After trituration with ether, the syrupy residue solidified on treatment with ether-acetone (2:1 by volume). Yield: 4.7 g. M.P.: 213° C. (from ethanol-i-propanol).

Calc.: N, 6.08; I, 27.57. Found: N, 6.14; I, 27.45.

The new benzisoxazole dyes described herein sensitize photographic emulsions in a useful manner. In blending or incorporating my dyes with a photographic emulsion, the customary procedures may be resorted to. For instance, it may be convenient to employ solutions of these novel dyes in appropriate solvents such as methanol, ethanol or acetone. Methanol, for instance, has proven satisfactory as a solvent for the majority of the dyes.

My new dyes may be used in a concentration which can vary over a wide limit such as from about 5 to about 100 milligrams per liter of liquid emulsion. The concentration of sensitizing dye employed for any particular emulsion is not a fixed factor but depends to a great extent on the type of silver halide emulsion employed. This is a situation of which the art is cognizant and any skilled operator is apprised of how to make adjustments in the concentrations of sensitizing dye solutions in order to adapt them to a particular type of emulsion.

A typical procedure whereby my dyes can be blended in a gelatino silver halide emulsion involves the following: A quantity of the dye such as from 5 to 100 milligrams is taken up in a conventional solvent such as methyl alcohol which is then slowly added to about 1 liter of the emulsion with stirring. It is advisable to continue stirring all during the interval when the dye solution is added to the emulsion. As pointed out above, the quantity of dye is dependent to a certain extent on the type of gelatino silver halide emulsion. For instance, with fine grain emulsions, it has been my finding that somewhat larger concentrations of the dye may be necessary in order to obtain the desired sensitizing effect.

Photographic silver halide emulsions which can advantageously be sensitized with my new dyes are the type customarily employed in the art and [includes] *include* such well known types as gelatino silver chloride, gelatino silver chlorobromide, gelatino silver bromide and gelatino silver bromoiodide emulsions.

I claim:

1. A photographic silver halide emulsion sensitized with a sensitizing dye selected from those represented by the following general formula:

(I)

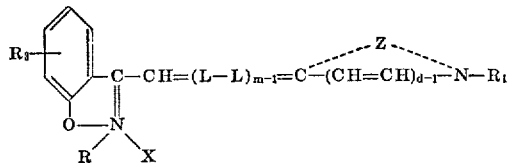

(II)

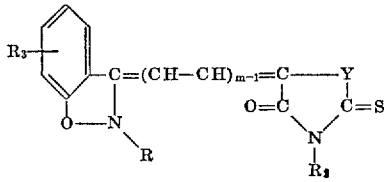

wherein R, $R_1$ and $R_2$ each represent a lower alkyl group, $R_3$ represents [an organic grouping selected from] *a member of* the [class] *group* consisting of *hydrogen,* lower alkyl, chlorine, lower alkoxy, hydroxy, nitro and amino, m is an integer of from 2 to 3, d is an integer of from 1 to 2, X is an anion, L, represents a methine group of the formula $\equiv C—R_4$, wherein $R_4$ represents a lower alkyl group, Y is selected from the class consisting of O, S and $NR_5$; wherein $R_5$ represents a lower alkyl group and Z represents the non-metallic atoms necessary to complete a heterocyclic nucleus of the thiazole series, thiodiazole series, benzothiazole series, quinoline series, pyridine series, and benzisoxazole series.

2. A photographic silver halide emulsion sensitized with a sensitizing dye selected from those represented by the following general formula:

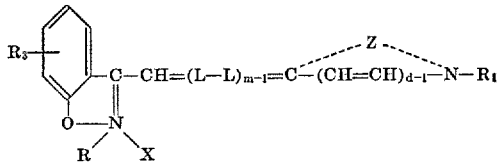

wherein R, $R_1$ each represent a lower alkyl group, $R_3$ represents [an organic grouping selected from the class] *a member of the group* consisting of *hydrogen,* lower alkyl, chlorine, lower alkoxy, hydroxy, nitro and amino and m is an integer of from 2 to 3, d is an integer of from 1 to 2, X is an anion, L represents a methine group of the formula $\equiv C—R_4$, wherein $R_4$ represents a lower alkyl group and Z represents the non-metallic atoms necessary to complete a heterocyclic nucleus of the thiazole series, thiadiazole series, benzothiazole series, quinoline series, pyridine series and benzisoxazole series.

3. A photographic silver halide emulsion sensitized with a sensitizing dye of the following general formula:

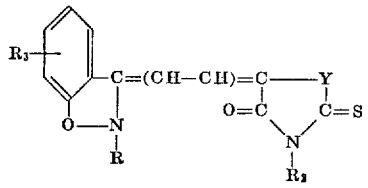

wherein R and $R_2$ each represent a lower alkyl group, $R_3$ represents [an organic grouping selected from the class] *a member of the group* consisting of *hydrogen,* lower alkyl, chlorine, lower alkoxy, nitro, hydroxy and amino, m is an integer of from 2 to 3, and Y is selected from the class consisting of O, S and $NR_5$, wherein $R_5$ represents a lower alkyl group.

4. A photographic silver halide emulsion sensitized with a sensitizing dye having the following formula:

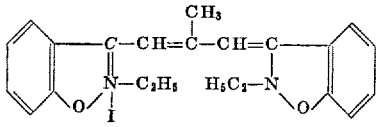

5. A photographic silver halide emulsion sensitized with a sensitizing dye having the following formula:

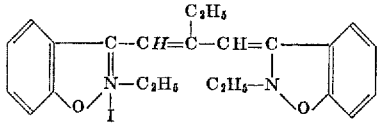

6. A photographic silver halide emulsion sensitized with a sensitizing dye having the following formula:

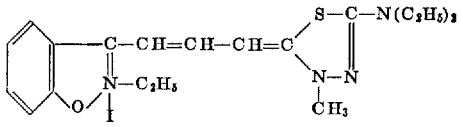

7. A photographic silver halide emulsion sensitized with a sensitizing dye having the following formula:

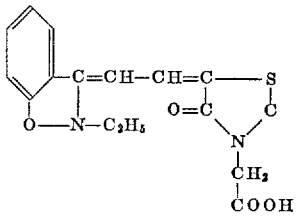

No references cited.

NORMAN G. TORCHIN, *Primary Examiner.*